Patented June 17, 1941

2,246,452

UNITED STATES PATENT OFFICE 2,246,452

PLASTIC DRYING OIL COATING

Orville V. McGrew, Chicago, Ill.

No Drawing. Application June 3, 1939,
Serial No. 277,321

7 Claims. (Cl. 134—39)

This invention relates to a plastic drying oil coating and to a composition suitable for forming the same.

Drying oil base paints have heretofore necessarily been applied in very thin layers. Any attempt to apply them in thicknesses greater than a few ten-thousandths of an inch resulted in the formation of a skin beneath which the remaining paint stayed liquid for long periods, resulting in poor adhesion, bubbles, and other defects. It has, therefore, been the universal practice to apply drying oil paints in a series of layers, allowing each layer to dry before the next was applied. The cost of labor in applying each coating was normally greater than the cost of the paint so that it was uneconomical to apply very many layers, as a consequence of which house paint and other structural finishes have always been very thin. Three or four coatings are generally the absolute maximum and even these would not substantially exceed in their dried thickness one-thousandth of an inch.

In order to produce a thicker layer in one coating, not only is it necessary to overcome the difficulty of surface drying before the body of the material has dried, but a coating must be produced which has unusual adherence to the base and to its own particles. Likewise, there can be little shrinkage or evaporation after application because a thick layer does not have the opportunity for readjustment which occurs in a thin layer. It must be sufficiently stiff that it will not flow after application and, therefore, there is a great tendency to produce cracks and other defects.

In accordance with the present invention a drying oil coating composition or paint is produced which can be applied in layers approximately $\frac{1}{32}$ to $\frac{1}{16}$ inch thick or even slightly more, will adhere firmly to the base, will not crack, check or disintegrate upon drying, is weatherproof, waterproof, and will last for indefinite periods. Accelerated tests upon its weather resistance showed no appreciable alterations in weatherometer tests corresponding to atmospheric exposures of many years.

The production of a plastic coating of this type requires very careful adjustment of the ingredients. If the drying oil content is too high the product will not dry through properly. If the coating includes solvents or thinners in large amounts it will shrink and crack after application. Likewise, if it does not include sufficient fillers, a thick layer will run after application, particularly on a vertical surface. The coating composition should include a small amount of a fairly short fibered material such as asbestos floats in order to tie it together and prevent cracking. On the other hand, it should contain a small proportion of an inert leafing material to provide slippage planes for expansion and contraction.

The drying oil base will normally comprise from 18% to 25% of the paint composition by weight. The preferred drying oil is kettle-bodied fish oil. This product is preferred because of its low cost, its adherent characteristics, and its resistance to weathering. The more expensive drying oils, such as linseed or China wood oil, when properly bodied, may be employed, but their relative expense makes them generally uneconomical.

The fibrous material is preferably asbestos floats which are fairly short fibres. Long fibres may be employed in some cases, but make it difficult or impossible to spray the paint. The amount of asbestos floats employed is preferably approximately 4% to 6%, but a wider range such as 2% to 8% may be employed if desired.

The leafing ingredient is preferably mica. The mica preferably has a mesh between 10 and 100. Best results have been obtained with a range of mica from 16 to 60, using appreciable amounts of mica at the various sizes between these ranges. Other plate-like or flaky materials, either metallic or nonmetallic, may be utilized capable of being made to leaf. Metallic leafing materials such as aluminum may be employed not only for their leafing qualities but for their pigmenting and protective values. Leafing materials are those thin, usually flaky materials like mica, flaked aluminum and other metals which tend to eliminate shrinkage or expansion strains and cracks by promoting slippage. These leafing materials do not float to the surface of the coating, but remain imbedded therein.

The amount of leafing material employed is fairly large, being preferably from about 10% to 22% of the composition, depending, however, upon the characteristics of the leafing material itself. At least 10% of mica should be employed but the upper limit is more flexible inasmuch as the mica may be used to replace some of the filling materials.

Small amounts of driers can be used to accelerate drying.

Likewise, in order to accelerate drying, it is preferred to employ a small amount of thinner. Preferably the amount of thinner should not be substantially in excess of the amount of drying oil. The thinner of course permits the use of more filling ingredients but it appears to have a much more essential characteristic in accelerating drying. Apparently the volatilization of the thinner results in keeping the plastic composition sufficiently porous to permit such contact with the air as is desirable for the setting of the drying oils. The amount of thinner should, therefore, be large enough to accomplish this purpose but should not be large enough to produce shrinkage upon its evaporation. Normally from 10% to 25% of a thinner is employed, the amount depending upon the characteristics thereof as well as upon its specific gravity. A preferred thinner is oleum spirits.

As an example of the invention, a plastic drying oil coating was prepared according to the following formula:

| | Per cent |
|---|---|
| Fish oil | 21.4 |
| White lead drier | .7 |
| Cobalt drier | .4 |
| Fibrous magnesium silicate | 11.5 |
| Titanium oxide-barium sulfate filler | 12.5 |
| Zinc oxide | 12.5 |
| No. 40 white mica | 5.7 |
| No. 160 white mica | 11.1 |
| Asbestos floats | 4.8 |
| Oleum spirits | 19.4 |
| | 100.0 |

The fish oil was a kettle-bodied sardine oil containing $\frac{1}{15}$ of 1% of cobalt added during processing. It is 100% non-volatile, has a viscosity at 77° F. of $v$—$v$ plus (Gardener-Holt). It had an iodine value of 105 to 115, acid value 2 to 3, and weighed 7.9 pounds per gallon.

The white lead drier was an oil resinate drier containing 2.5% of lead. The cobalt drier was an oil resinate drier containing 0.8% of cobalt.

The magnesium silicate was of a kind of which 99% passes 325 mesh. The zinc oxide employed is an acicular product of not too fine a mesh.

No. 40 white mica is made up of material fairly evenly distributed as to size between 16 and 40 mesh, with about 10% of 60 mesh material. No. 160 mica is approximately 28.5% 40-mesh and 60.5% 60-mesh material. The mesh figures here given refer to the size upon which the product is caught after passing the next previous commercial mesh size.

The asbestos floats are of a size such that 12.5% is caught on a 0.1 inch mesh screen and 87.5% passes through it.

The above composition had a buttery consistency and somewhat resembled plaster in appearance and texture. It was not suitable for application with a brush but was sprayed easily. When applied in layers about $\frac{1}{16}$ inch thick the material formed a skin coating in about 12 hours and set throughout in from 48 to 54 hours under normal atmospheric conditions. The product adhered very well to base surfaces such as wood or metal.

When applied with a sprayer the product is not built up in successive thin layers but on the contrary the sprayer is adjusted so that gobs of the material are applied having a thickness of about $\frac{1}{16}$ inch and the spraying is continued until the surface is covered with such particles. There is of course considerable readjustment of the plastic mass during this process but in general the structure of the paint may be said to be largely vertical to the surface rather than parallel with it. There is apparently some alignment of the fibres in this way which furthers the drying of the material. Possibly the fibres provide an avenue for egress of thinner vapors and ingress of air to act upon the drying oil.

The fillers employed may be varied largely at will but it is preferred to employ zinc oxide as a large proportion thereof.

The zinc oxide has an apparent catalytic effect upon the coating composition, producing proper drying throughout and also in increasing the strength of the applied material. The mode of operation of the zinc oxide is not thoroughly understood. It apparently serves as a polymerization catalyst but at the same time it increases the ability of the coating composition to "breathe" and dry throughout. It also appears to retard chalking and at the same time to render the removal of what coating does chalk much more easy. It also appears to increase moisture resistance so that blistering, which is a very serious problem in connection with thick coats of drying oil paints, is eliminated.

It is preferred that zinc oxide or its equivalent compose at least 10% of the coating composition and at least 15%, and preferably 20% to 30%, of the solid ingredients thereof. It may compose all of the pigmenting portion, or filler portion of the coating composition.

The specific example of plastic coating heretofore described was a white paint, but colored paints may be produced if desired. In view of the long life of the plastic coat, only very stable coloring material should be employed. Chromium oxide may be employed for a green paint, chrome yellow for a yellow paint, non-bronzing iron blue or cobalt for a blue paint, red iron oxide and chrome yellow in combination for a brown paint, ferrite yellows for a tan paint, light chrome yellow for a cream paint, red iron oxide for a red paint, carbon black for a brown-toned gray, and lamp black for a blue-toned gray paint.

The coating composition normally has a rough finish, somewhat resembling a rough cement or a smooth stucco. It can be made smoother or rougher by varying the length of the fibres of fibrous material or by control of the spray.

The coating composition gradually "chalks" with age, so that the dirty exterior surface may readily be washed away, and a clean surface thus preserved for very many years.

What I claim as new, and desire to secure by Letters Patent, is:

1. An adherent weather-proof, waterproof, drying oil base coating capable of drying rapidly throughout in layers as thick as approximately $\frac{1}{16}$ inch without cracking, comprising: 18% to 25% drying oil, 2% to 8% of an inert fibrous binder, 10% to 22% of an inert plate-like material capable of being leafed, 10% to 25% of thinner, a drier, and the balance being substantially all filler in proportion to render the composition buttery.

2. A composition as set forth in claim 1, in which at least 15% of the filler is zinc oxide.

3. A drying oil base coating composition as set forth in claim 1, in which the drying oil is kettle-bodied fish oil.

4. An adherent weather-proof, waterproof, drying oil base coating capable of drying rapidly throughout in layers as thick as approximately $\frac{1}{16}$ inch without cracking, comprising: 18% to 25% drying oil, 2% to 8% of an inert fibrous binder, 10% to 22% of mica, 10% to 25% of thinner, a drier, and the balance being substantially all filler in proportion to render the composition buttery.

5. A dry weather-proof adherent drying oil base coating composition comprising a layer at least 3/32 inch in average thickness comprising an oxidized drying oil binder adherently holding together particles of filler, a fibrous material homogeneously distributed through the paint composition, a plate-like material distributed homogeneously in leaf form through the paint composition, the drying oil binder comprising from 18 to 25 parts, the fibrous material from 2 to 8 parts, the plate-like material from 10 to 22 parts, and the balance is substantially all filler, the drying oil comprising approximately 20% to 33% of the dried paint composition.

6. A composition as set forth in claim 5, of which at least 15% is zinc oxide.

7. A composition as set forth in claim 5, of which approximately 20% to 30% is zinc oxide.

ORVILLE V. McGREW.